(12) United States Patent
Glidewell

(10) Patent No.: US 9,707,946 B2
(45) Date of Patent: Jul. 18, 2017

(54) SURGE BRAKE ACTUATOR

(71) Applicant: Kodiak Products Co., Inc., Fort Worth, TX (US)

(72) Inventor: William E. Glidewell, Lewisville, TX (US)

(73) Assignee: Kodiak Products Co., Inc., Fort Worth, TX (US)

( * ) Notice: Subject to any disclaimer, the term of this patent is extended or adjusted under 35 U.S.C. 154(b) by 320 days.

(21) Appl. No.: 14/196,304

(22) Filed: Mar. 4, 2014

(65) Prior Publication Data
US 2015/0226238 A1 Aug. 13, 2015

Related U.S. Application Data

(60) Provisional application No. 61/937,145, filed on Feb. 7, 2014.

(51) Int. Cl.
*F15B 15/02* (2006.01)
*B60T 11/224* (2006.01)
*F15B 3/00* (2006.01)
*F15B 15/20* (2006.01)

(52) U.S. Cl.
CPC .............. *B60T 11/224* (2013.01); *F15B 3/00* (2013.01); *F15B 15/204* (2013.01)

(58) Field of Classification Search
CPC ............................. B60T 11/20; B60T 11/224
USPC ..................................... 91/392, 410; 60/581
See application file for complete search history.

(56) References Cited

U.S. PATENT DOCUMENTS 354,524 A * 12/1886 Worthington ........... F15B 15/24
91/22
542,930 A * 7/1895 Guilford .................. B25D 9/18
91/22
1,958,722 A * 5/1934 Sinclair ................. B60T 11/224
188/347

(Continued)

FOREIGN PATENT DOCUMENTS

| DE | 1780621 A1 * | 3/1972 | ............ B60T 11/224 |
| DE | 10164319 A1 * | 7/2003 | ............ B60T 11/224 |
| GB | 1130943 A * | 10/1968 | ............ B60T 11/224 |

OTHER PUBLICATIONS

Operation of Two-Stage Mico Master Cylinders, Mico, Inc., Form No. 84-001-001, 2 pages, Online Revised Sep. 13, 2013.

*Primary Examiner* — Thomas E Lazo
*Assistant Examiner* — Matthew Wiblin
(74) *Attorney, Agent, or Firm* — Sand & Sebolt

(57) ABSTRACT

A hydraulic actuator which may be used as a surge brake actuator may include a housing defining a low pressure chamber and a high pressure chamber, a low pressure piston assembly which is in the low pressure chamber and has a contact surface, a high pressure piston assembly which is in the high pressure chamber and which moves forward in response to forward movement of the low pressure piston assembly, and an unloader valve in fluid communication with the low pressure chamber and having a closed position and an open position adapted to allow hydraulic fluid to flow out of the low pressure chamber through the unloader valve, wherein the contact surface engages and pushes the unloader valve from the closed position to the open position during forward movement of the low pressure piston assembly. The actuator may be used for actuating a brake system.

29 Claims, 7 Drawing Sheets

(56) References Cited

U.S. PATENT DOCUMENTS

| | | | | |
|---|---|---|---|---|
| 2,152,345 A | * | 3/1939 | Bowen | B60T 11/203 188/152 |
| 2,508,403 A | * | 5/1950 | Knauss | B60T 11/224 137/115.13 |
| 8,550,116 B2 | * | 10/2013 | Batchelor | B60T 11/08 137/625.25 |
| 2009/0050419 A1 | * | 2/2009 | Walstrom | B60T 11/107 188/112 R |

* cited by examiner

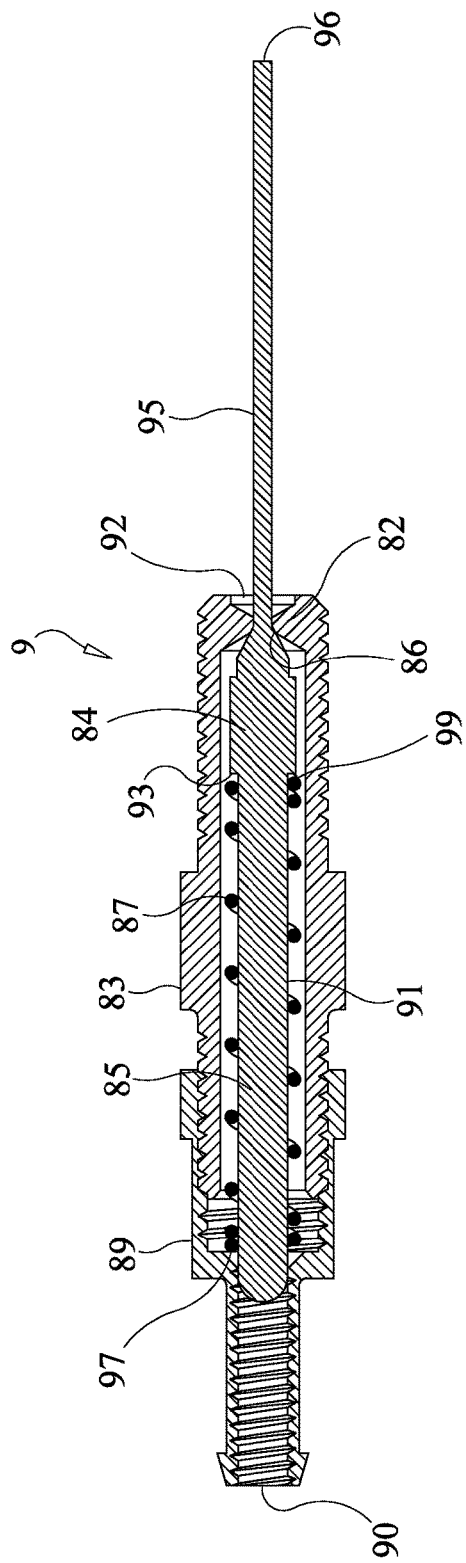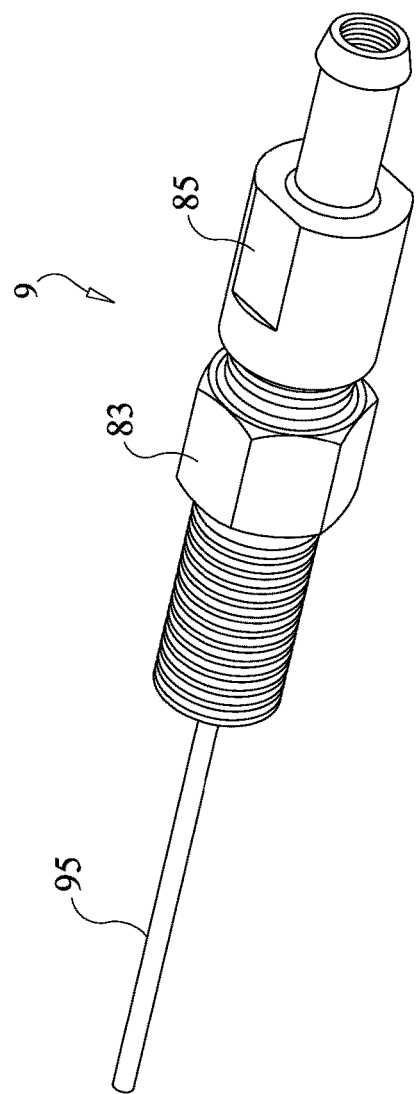
FIG. 5A
FIG. 5B

SURGE BRAKE ACTUATOR

CROSS-REFERENCE TO RELATED APPLICATION

This application claims priority from U.S. Provisional Application Ser. No. 61/937,145, filed Feb. 7, 2014, the disclosure of which is incorporated herein by reference.

BACKGROUND OF THE INVENTION

1. Field of Invention

The invention relates generally to hydraulic actuators and a method of using the same. The hydraulic actuator may be used in a system for braking vehicles, such as by actuating hydraulic brakes of trailers, and is well suited for use as a surge brake actuator for use with a hydraulic braking system for trailers.

2. Description of Related Art

For towed vehicles, such as trailers, it is and has been common, if not required, to provide a self-contained hydraulic braking system that operates independently of the braking system of the towing vehicle. A surge brake actuator permits the towed vehicle to actuate its own braking system when the towing vehicle decelerates.

Historically, a surge brake actuator generally included a coupler housing component mounted on the towed vehicle and attached to the towing vehicle and a hydraulic master cylinder component that actuates the braking system of the towed vehicle. These surge brake actuators operate such that when the towing vehicle decelerates, the forward momentum of the towed vehicle applies a force on the coupler housing. The hydraulic master cylinder utilizes the resultant force on the coupler housing component to generate fluid pressure to actuate the braking system of the towed vehicle. Specifically, the resultant force is translated into fluid pressure within the hydraulic master cylinder to activate the braking system of the towed vehicle.

The output pressure of the braking system was a function of the ability of the brake actuator to convert the forces provided by the towing vehicle into hydraulic pressure so as to actuate the braking system of the towed vehicle. This force/pressure ratio is an important component in the ability of an actuator to provide adequate braking pressure to the towed vehicle.

Historically, braked trailers in the United States have used electric drum brakes, partly due to their low price. The braking effectiveness of drum brakes in general and electric drum brakes in particular fades significantly as operating temperatures increase. Drum brakes also require substantial maintenance. Certain application, such as boat trailers, are inherently ill suited for electric brakes and therefore virtually all boat trailers use hydraulic brakes (both disc and drum) actuated by surge brake actuators.

Surge brake actuators were originally designed to actuate drum brakes, not disc brakes. They worked well in that they furnished (1) the necessary volume to take up the "hydraulic slack" out of the system (e.g., move the brake shoe to engage the brake drum) and to account for brake line/hose expansion and (2) provide the necessary pressure to properly actuate the brakes. Drum brakes do not require high pressures to operate because drum brakes are, to an extent, self-energizing. This is because the direction of rotation of the drum "pulls" the forward shoe towards the drum. This partially self-energizing design results in a situation where a small increase in brake line pressure can generate a substantial increase in brake torque.

On the other hand, disc brakes are not "self-energizing". In fact disc brakes react rather linearly with the addition of more hydraulic pressure. For example, an increase of about 5% more hydraulic pressure may result in a 4% increase in braking force. Consequently disc brakes require more pressure for proper operation than do drum brakes.

However, today's surge brake manufacturers still offer basically the same actuator (same piston diameter and same stroke length) for both drum and disc brakes. This means that surge braked trailers with disc brakes are likely under-braked due to inadequate pressure being generated by the surge brake actuator. Therefore, when the towing vehicle has to slam on its brakes in an emergency situation, or for other reasons, the under-braked trailer will impair the braking performance of the combination of vehicles sufficiently to cause a collision between the towing vehicle and other nearby vehicles.

Two scenarios are common when the towing vehicle must perform an emergency stop. If the combination of vehicles (towing and towed vehicle) brake during a turn and the towed vehicle brakes do not have enough pressure to properly operate, the forward momentum of the towed vehicle will likely cause the combination of vehicles to jackknife. During the analogous situation while the combination is braking in a straight line, the forward momentum of the towed vehicle will add to the braking load of the towing vehicle, thereby lengthening the stopping distance of the combination.

These types of emergency stops happen thousands of times a year in the United States alone, causing significant human suffering and property damage. Therefore, a better surge brake actuator is needed.

SUMMARY

In one aspect, the invention may provide an actuator comprising a housing defining a low pressure chamber and a high pressure chamber; a low pressure piston assembly which is in the low pressure chamber and has a contact surface; a high pressure piston assembly which is in the high pressure chamber and which moves forward in response to forward movement of the low pressure piston assembly; and an unloader valve in fluid communication with the low pressure chamber and having a closed position and an open position adapted to allow hydraulic fluid to flow out of the low pressure chamber through the unloader valve; wherein the contact surface engages and pushes the unloader valve from the closed position to the open position during forward movement of the low pressure piston assembly.

In another aspect, the invention may provide a method of operating an actuator comprising the steps of providing a low pressure piston assembly in a low pressure piston chamber and a high pressure piston assembly in a high pressure piston chamber in fluid communication with the low pressure piston chamber; moving the low pressure piston assembly forward within the low pressure chamber a first distance toward the high pressure piston assembly so that the low pressure piston assembly forces hydraulic fluid at a first pressure from the low pressure chamber through a passage in the high pressure piston assembly until the low pressure piston assembly sealingly contacts the high pressure piston assembly to stop additional flow of hydraulic fluid through the passage; pushing an unloader valve open via contact of the low pressure piston assembly with the unloader valve during forward movement of the low pressure piston assembly to allow hydraulic fluid to flow out of the low pressure chamber through the unloader valve; and while the unloader valve remains open, moving the low pressure piston assembly forward within the lower pressure chamber a second additional distance so that the low pressure piston assembly pushes the high pressure piston assembly forward whereby the high pressure piston assembly forces hydraulic fluid forward of the high pressure piston assembly at a second higher pressure out of the high pressure chamber via a high pressure chamber exit port.

BRIEF DESCRIPTION OF SEVERAL VIEWS OF THE DRAWINGS

One or more sample embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 1A also shows diagrammatically a towing vehicle and a towed vehicle having a brake system.

FIG. 5A is a sectional view of the unloader valve.

FIG. 5B is a perspective view of the unloader valve.

Similar numbers refer to similar parts throughout the drawings.

DETAILED DESCRIPTION

Figure 1A:
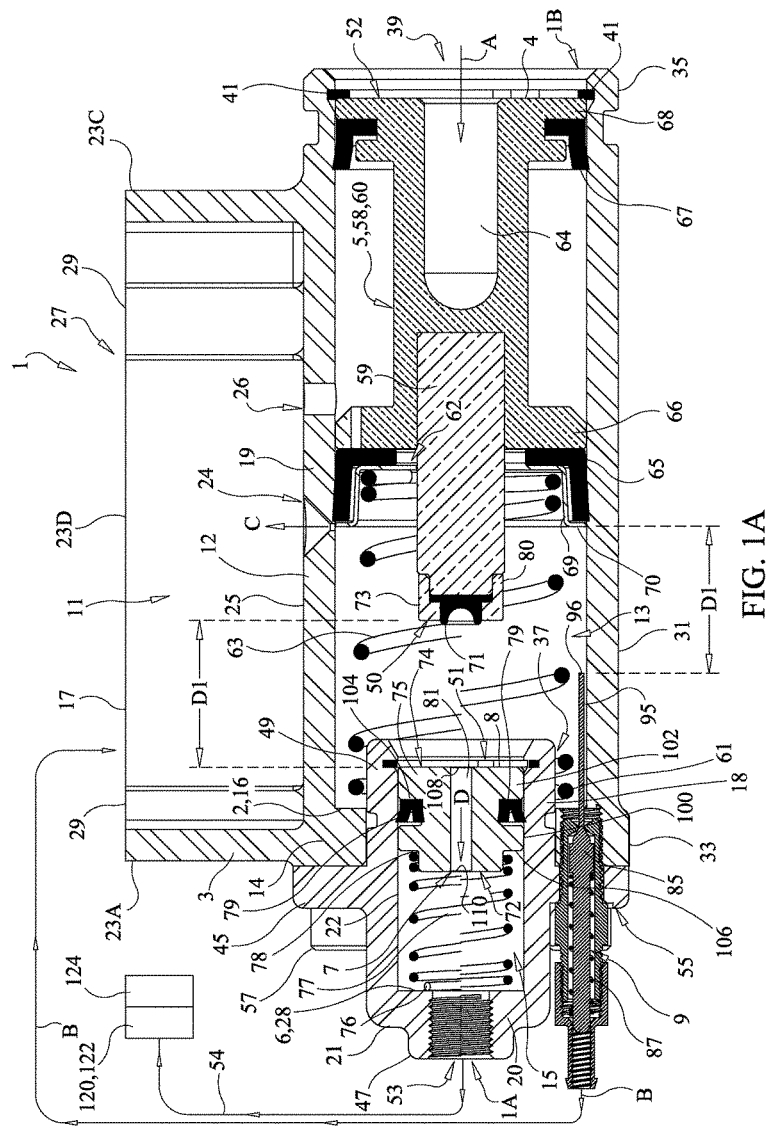
FIG. 1A is primarily a sectional view of a sample embodiment of a surge brake actuator taken on line A-A of FIG. 1B, showing the low pressure piston assembly and high pressure piston assembly in their home or resting positions and the unloader valve in the closed position.

FIG. 1 illustrates a sample embodiment of a surge brake actuator 1 which may be used with a brake system 120 of a trailer or towed vehicle 122 which is hitched to and towed by a towing vehicle 124. While actuator 1 is discussed herein generally as being a surge brake actuator, it should be understood that actuator 1 may be used in any suitable context and may be referred to, for example, as a hydraulic actuator or a power cylinder actuator. As best seen in FIG. 1, actuator 1 has a main housing 3, a low pressure piston assembly 5, a high pressure piston assembly 7 and an unloader valve 9. Main housing 3 forms a hydraulic fluid or brake fluid reservoir 11, a low pressure piston chamber 13, and a high pressure piston chamber 15. Chamber 13 has a front end 2 and a rear or back end 4. Chamber 15 has a front end 6 and a rear or back end 8. Main housing 3 is preferably formed out of rigid material such as metal or a very rigid polymer and can be formed out of a single piece of material or out of sections of material with the sections mechanically and/or adhesively attached together. For example, main housing 3 can have a generally rectangular fluid reservoir housing 17, a low pressure piston housing 19 and a high pressure piston housing 21. These three sections can be individually formed and then attached together to form main housing 3. Of course those of ordinary skill in the art will appreciate that main housing 3 can be partitioned and/or formed in other ways. Actuator 1 has a front end 1A and a back or rear end 1B which define therebetween a longitudinal direction of actuator 1 and its various components. Front and rear ends 1A and 1B also serve as front and rear ends of main housing 3.

Figure 2B:
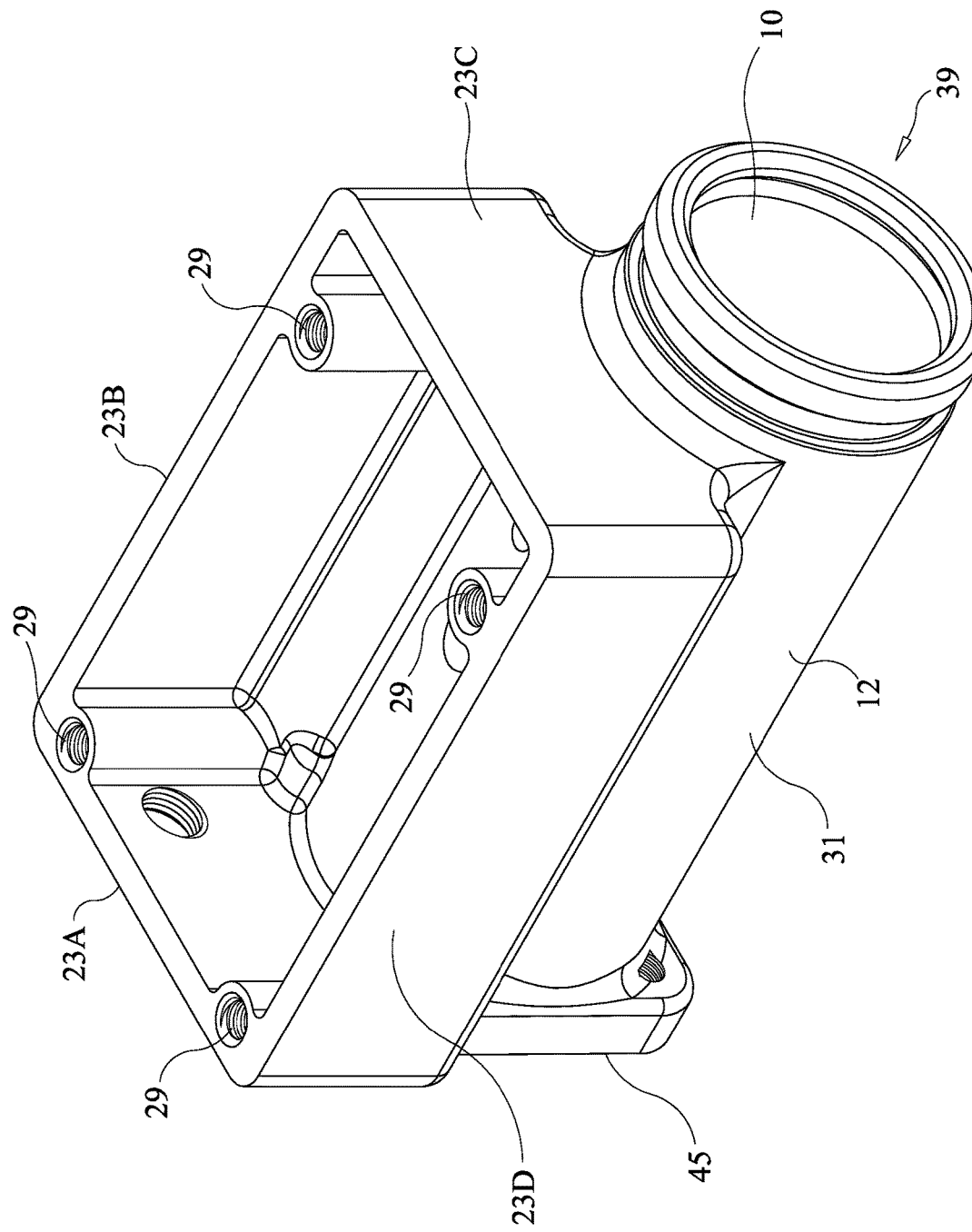
FIG. 2B is a perspective view of the main housing of the sample embodiment as viewed from the rear, right and above.
Figure 3:
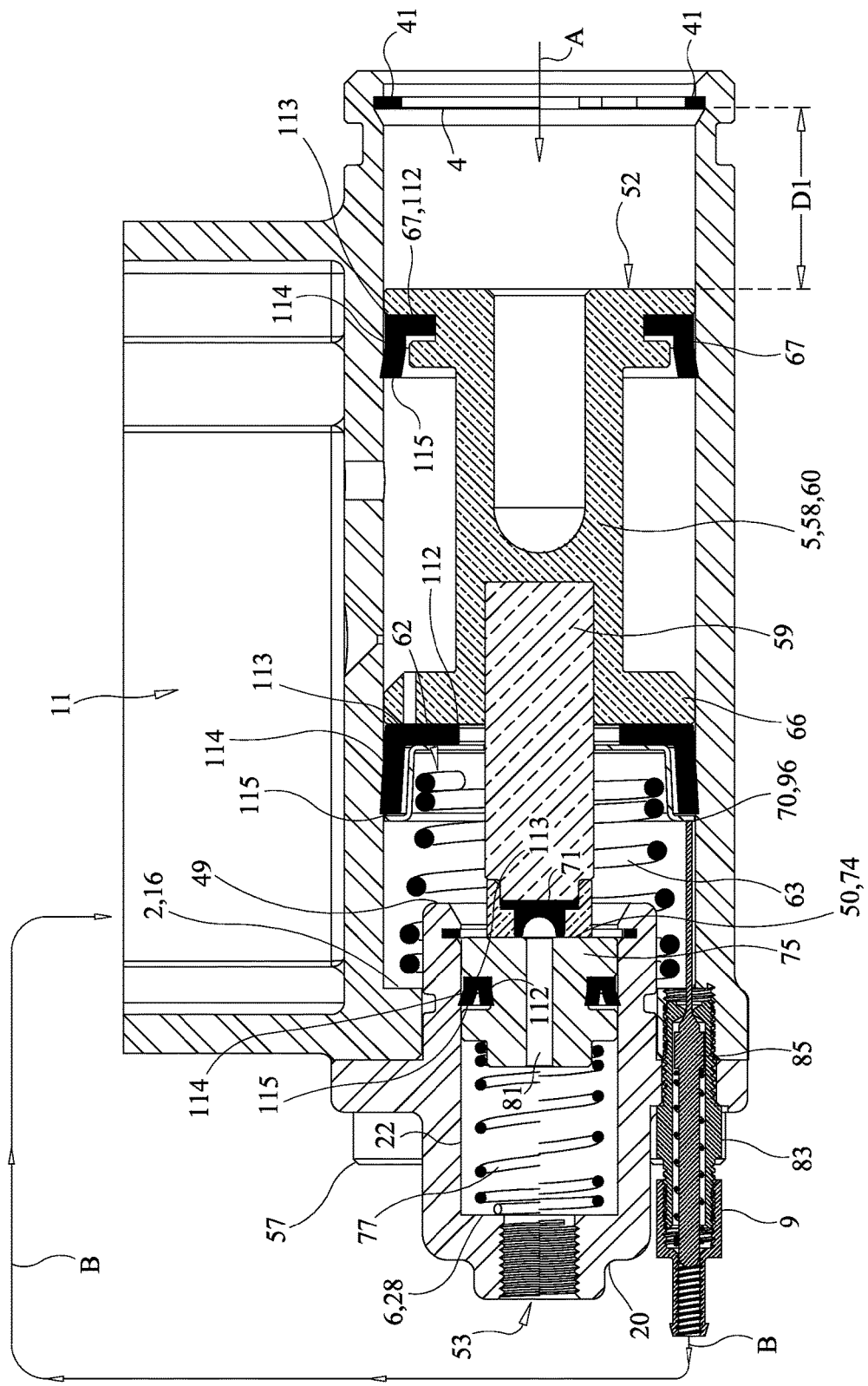
FIG. 3 is a view similar to FIG. 1A showing the low pressure piston having moved forward during an initial stage of a surge force from its home position to initially contact the unloader valve while the front seal contacts the high pressure piston, which remains in its home position.
Figure 4:
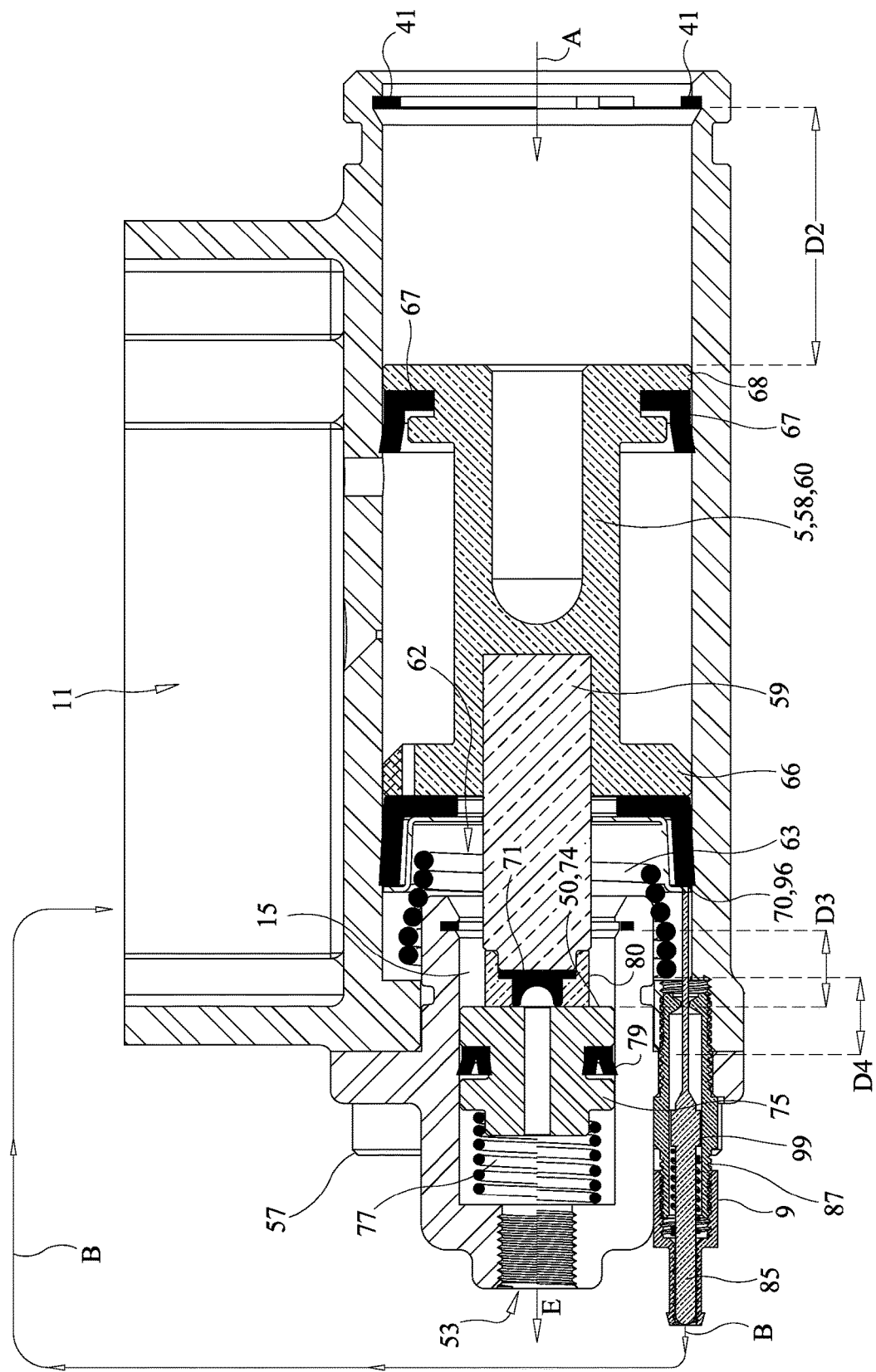
FIG. 4 is a view similar to FIG. 1A and shows a stage subsequent to the stage of FIG. 3, with the low pressure piston having moved further forward during the surge force beyond the FIG. 3 position and pushed the high pressure piston forward out of its home position while the unloader valve has moved to an open position.

The generally rectangular fluid reservoir housing 17 can be formed with a front side wall 23A, a right side wall 23B, a back side wall 23C, a left side wall 23D and a bottom wall 25. In the sample embodiment, an upper portion of rectangular fluid reservoir housing 17 opposite bottom 5 is an opening 27 that is shaped to fit onto a conventional surge brake actuator already on a trailer. In other words, this allows the sample embodiment to be retrofitted to an existing brake system on a trailer. Of course in other embodiments, surge brake actuator 1 can include a top cover to cover opening 27 of fluid reservoir housing 17. Housing 17 can include one or more fastening device posts 29 (best seen in FIG. 2B) for receiving fastening devices such as bolts used to mount surge brake actuator 1 to the brake system of a trailer. Bottom wall 25 of housing 17 defines a small through opening 24 extending between and in fluid communication with reservoir 11 and the top of chamber 13 to supply hydraulic or brake fluid to a front portion of low pressure piston chamber 13 or receive brake fluid therefrom when low pressure piston assembly 5 is in its home position (FIG. 1A). Bottom wall 25 defines a larger through opening 26 which is rearward of opening 24 and extends between and is in fluid communication with reservoir 11 and the top of chamber 13 to supply hydraulic brake fluid to a rear portion of chamber 13 or receive brake fluid therefrom when the 5 is in its home position. Brake fluid may also flow between reservoir 11 and chamber 13 in either direction when assembly 5 is in an activated position, such as shown in FIGS. 3 and 4. Reference to brake fluid herein will be understood as one type of hydraulic fluid.

Low pressure piston housing 19 has a front end 33 and a back or rear end 35. Housing 19 has a general cylindrical portion 31 which forms chamber 13. Housing 19 includes a typically cylindrical sidewall 12 extending from front end 33 to back end 35 and an annular front wall 14 which is rigidly secured to and extends radially inwardly from sidewall 12 adjacent front end 33. Sidewall 12 has a typically cylindrical inner surface 10 which faces radially inward and extends from front end 2 to back end 4. Front wall 14 has a rearwardly facing inner back surface 16 which defines front end 2 of chamber 13. Inner surfaces 10 and 16 together define interior chamber 13, which is typically substantially cylindrical from front end 2 to back end 4. Sidewall 12 forms part of bottom wall 25 of the reservoir housing.

Front end 33 of chamber 13 receives high pressure piston housing 21. Back end 35 of low pressure piston housing 19 includes a generally circular rear entrance opening 39 for slidably receiving low pressure piston assembly 5 into chamber 13 during assembly of actuator 1. A flange or retaining ring 41 is inserted in a groove near back end 35 of housing 19 and has a front forward facing surface defining back end 4. The back end of assembly 5 rests against or is in contact with the front surface of ring 41 when it is not under any braking pressure (or under residual pressure) to retain assembly 5 within chamber 13, that is to prevent assembly 5 from sliding rearwardly out of chamber 13.

High pressure piston housing 21 has a front end 47 forward of and external to chamber 13, and a back end 49 within the front portion of chamber 13. Housing 21 includes a typically cylindrical sidewall 18 extending from front end 47 to back end 49 and an annular front wall 20 which is rigidly secured to and extends radially inwardly from sidewall 18 adjacent front end 47. Sidewall 18 has a typically cylindrical inner surface 22 which faces radially inward and extends from front end 6 to back end 8. Front wall 20 has a rearwardly facing inner back surface 28 which defines front end 6 of chamber 15. Inner surfaces 22 and 28 together define interior chamber 15, which is typically substantially cylindrical from front end 6 to back end 8. Housing 21 includes a generally square, flat shaped mounting plate 45 which is rigidly secured to and may extend radially outwardly from sidewall 18 intermediate and generally midway between front and rear ends 47 and 49. Chamber 15 has a cross sectional area (as viewed in the longitudinal direction) defined by inner surface 22 which is substantially smaller than that of chamber 13 defined by inner surface 10. Where inner surfaces 10 and 22 are cylindrical, inner surface 22 has a diameter which is substantially smaller than that of inner surface 10.

Figure 1B:
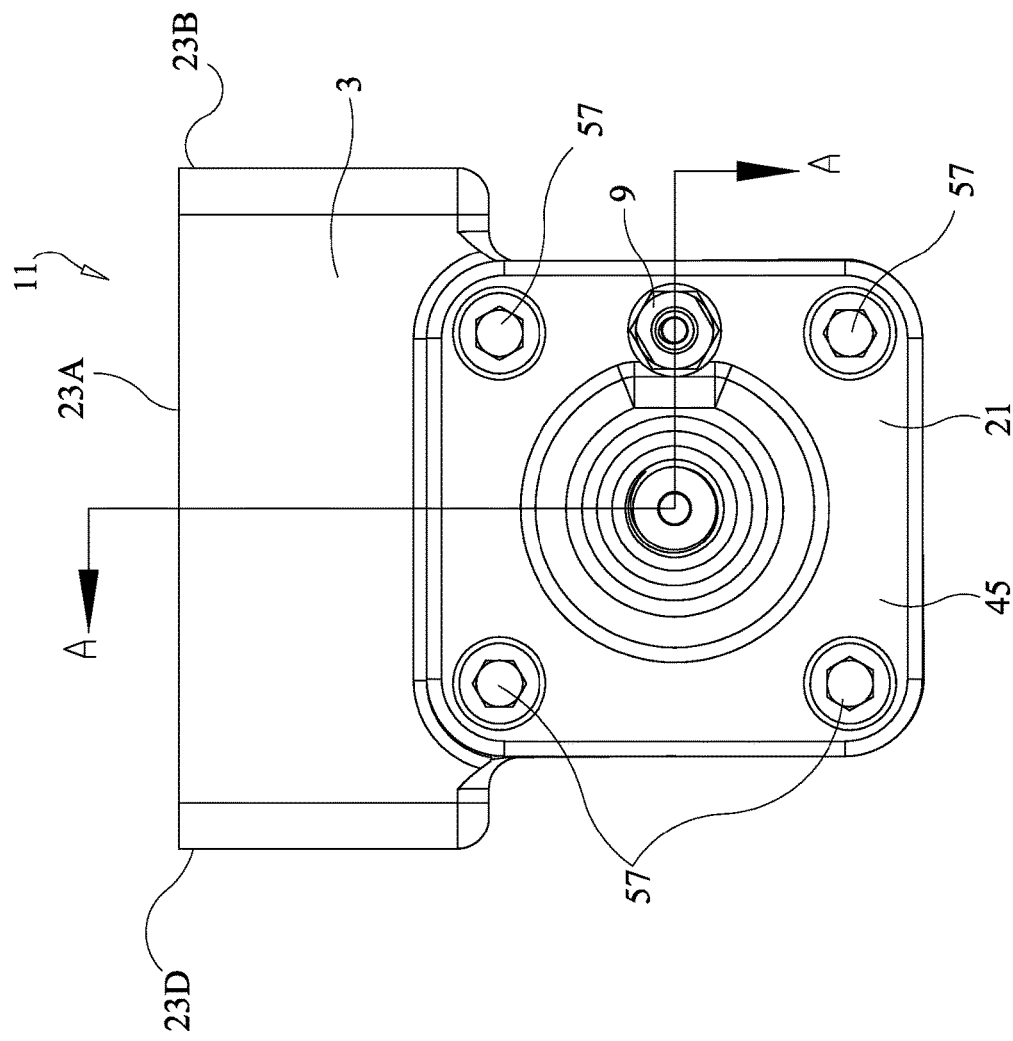
FIG. 1B is a front elevation view of the sample embodiment.
Figure 2A:
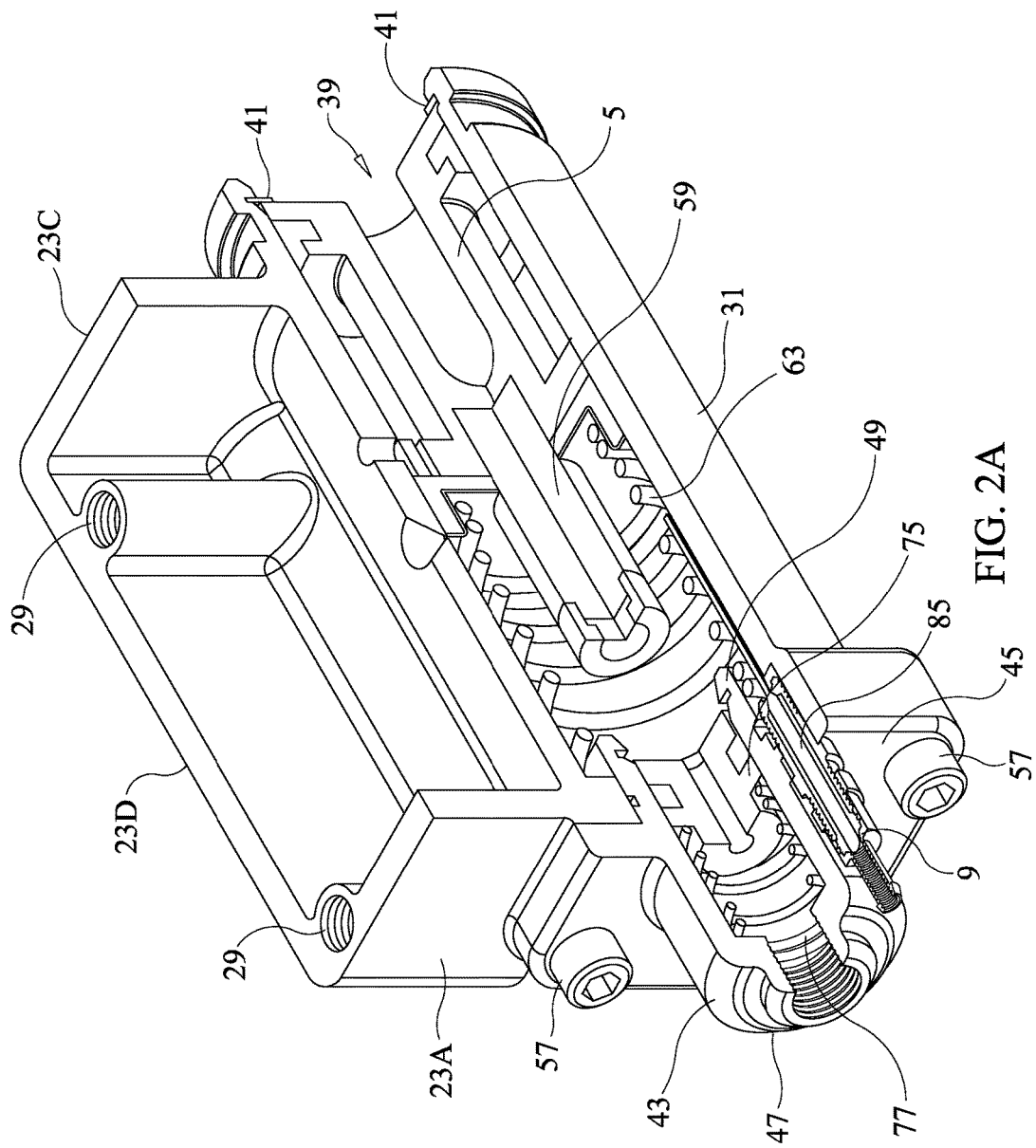
FIG. 2A is a perspective view of the sample embodiment shown in section as viewed from the front, right and above.

A rear entrance opening 51 is formed in back end 49 and defined by sidewall 18 to allow the insertion of assembly 7 into chamber 15 during assembly of actuator 1. Entrance opening 51 is inside of and in fluid communication with chamber 13. An opening or brake fluid port 53 is formed in front end 74 to allow for the connection of a hydraulic line of a brake system of a trailer surge brake actuator 1 is attached to. Port 53 may serve as an exit port or outlet for fluid exiting chamber 15 or an entrance port or inlet for brake fluid entering chamber 15. As discussed below, surge brake actuator 1 supplies brake fluid to the brake system through opening 53, which is in fluid communication with chamber 15. Opening 53 may be threaded to allow a hydraulic brake line 54 (shown diagrammatically in FIG. 1A) to be threadedly attached to front end 47 of housing 21 to provide fluid communication between chamber 15 and brake line 54 via port 53. Mounting plate 45 defines a through hole 55 which communicates with chamber 13. Unloader valve 9 is mounted within and passes through hole 55 next to housing 21. Housing 21 is rigidly secured to front wall 23A of housing 17 and front wall 14 of housing 19 by bolts 57 (as best seen in FIGS. 1B and 2A) other suitable fasteners known in the art.

Low pressure piston assembly 5 is slidably movable forward and backward within chamber 13. Assembly 5 has a forward facing front end or surface 50 and a rearward facing rear or back end or surface 52 which may also serve respectively as a forward facing front end or surface of piston 59 and a rearward facing rear end or surface of piston 59. In the exemplary embodiment, assembly 5 includes a rigid low or lower pressure piston 59, a front seal 71, a rear cup seal 67, a forward or intermediate cup seal 65 which is longitudinally intermediate seals 71 and 67, and a rigid cup 69. Seal 65 is forward of rear seal 67 and rearward of front seal 71. Seals 65, 67 and 71 are mounted on piston 59 and formed of rubber or another elastomer, a plastic material or another suitable material. Seals 65, 67 and 71 are typically compressible seals formed of a compressible and flexible material. Piston 59 has a rigid rear piston section 58 with a central body 60, a front radial flange 66 extending radially outwardly from a front end of body 68 and a rear radial flange 68 extending radially outwardly from a rear end of body 68. Forward seal 65 is adjacent, mounted on and forward of front flange 66 and rear seal 67 is adjacent, mounted on and forward of rear flange 68. Typically, the forward facing front surfaces of flanges 66 and 68 engage the rearward facing back surfaces of seals 65 and 67 respectively. During forward and rearward movement of piston assembly 5 within chamber 13, the typically circular or cylindrical outer perimeters of seals 65 and 67 slidably and sealingly engage inner surface 10 of sidewall 12. Seals 65 and 67 form a seal between the outer perimeter or outer surface of piston 59 and inner surface 10, thus preventing brake fluid from flowing forward or rearward past the given seal 65 or 67 between these inner and outer surfaces.

Piston 59 further includes a rigid front section 73 which is rigidly secured to and extends forward from forward flange 66 and has a forward facing front end or surface represented at 50 which may defines a front end of piston 59 which is spaced forward of front flange 66 and forward seal 65. Front section 73 includes a front portion 80 which serves as a front portion of piston 59 and which defines front end 50 and may include seal 71. Front section 73 may be in the form of a rod having a substantially smaller cross sectional size or outer diameter than that of flanges 66 and 68. Front flange 66 extends radially outwardly from front section 73. Front seal 71 is secured to front section 73 of piston 59 adjacent front end 50 and may include a frontmost portion of section 73 and piston 59. Unlike seals 65 and 67, front seal 71 does not contact inner surface 10 of sidewall 12. Low pressure piston 59 defines a pushrod chamber 64 which extends forward from the rear end of piston 59 and can be used to receive a pushrod of an overrun brake system of the trailer.

A low pressure coil spring 63 is mounted within the front portion of chamber 13 and has a front end 61 adjacent front end 33 of housing 19 and a rear end 62 adjacent front flange 66 and forward seal 65. Front end 61 is in contact with surface 16 of front wall 14 and rear end 62 is in contact with cup 69. Spring 63 adjacent front end 61 circumscribes or extends around a rear portion of sidewall 18 of housing 21. Spring 63 biases piston assembly 5 rearwardly toward the home position of assembly 5 in which rear end/flange 68 contacts ring 41. Cup 69 is between the rear end of spring 63 and forward seal 65 so that cup 69 absorbs and spreads out rearwardly directed forces which are generated by spring 63 and translated to seal 65 via cup 69. Cup 69 extends radially outward from adjacent front section 73 forward of and adjacent seal 65 and flange 66. Cup 69 includes a portion which is forward of the front end of seal 65 and has a forward facing contact surface or valve activation surface 70 of piston assembly 5.

With primary reference to FIG. 1A, high pressure piston assembly 7 includes a high pressure piston 75 and a high pressure seal 79. Assembly 7 has a forward facing front end or surface 72 and a rearward facing rear or back end or surface 74 which also serve respectively as a forward facing front end or surface of piston 75 and a rearward facing rear end or surface of piston 75. Seal 79 is formed of the same type of materials as those discussed with respect to seals 65, 67 and 71. During forward and rearward movement of piston assembly 7 within chamber 15, seal 79 slidably and sealingly engages the typically cylindrical inner surface of housing 21 which defines chamber 15. Seal 79 forms a seal between the outer perimeter or outer surface of piston 75 and the inner surface of housing 21 which defines chamber 15, thus preventing brake fluid from flowing forward or rearward past seal 79 between these inner and outer surfaces. Piston 75 has forward and rear flanges 100 and 102 defining longitudinally therebetween a groove in which seal 79 is disposed with a rearward facing back surface of seal 79 contacting an annular forward facing front surface 104 of rear flange 102. Forward or front flange 100 has an annular forward facing front surface 106. Piston 75 defines a through hole or passage 81 which extends from back 74 of piston 75 to front 72 of piston 75 and has a rear or back entrance opening 108 at back end 74 and a front entrance opening 110 at front end 72. When hole or passage 81 is not sealed by seal 71 as discussed further below, hole 81 allows hydraulic brake fluid to pass through it in a forward direction from chamber 13 to chamber 15 or in a rearward direction from chamber 15 to chamber 13.

High pressure piston assembly 7 has a cross sectional area (as viewed in the longitudinal direction) defined by the outer perimeter of seal 79 which is substantially smaller than that of low pressure piston assembly 5 defined by the outer perimeter of seal 65 (or 67). Where the outer perimeters of seals 65, 67 and 79 are cylindrical, the outer perimeter of seal 79 has a diameter which is substantially smaller than that of seals 65 and 67.

Each of seals 65, 67 and 79 is a forward facing seal. That is, each of these seals has a first or radially inward segment 112 and a second or radially outward segment 114 which is secured to an outer radial end 113 of the first segment 112 and extends forward and radially outward from the radial 113 end to a forward terminal end or tip 115. Thus, segment 114 of each of seals 65, 67 and 79 is configured to flex or flare radially outwardly if the pressure of brake fluid forward of the given seal is higher than the pressure of brake fluid behind the given seal in order to prevent flow of brake fluid rearward past the given seal. On the other hand, segment 114 of each of seals 65, 67 and 79 is configured to flex radially inwardly if the pressure of brake fluid forward of the given seal is lower than the pressure of brake fluid behind the given seal, thereby allowing flow of brake fluid forward past the given seal. It is noted, however, that there is essentially no brake fluid in chamber 13 rearward of seal 67 other than from incidental leakage rearward around seal 67.

A high pressure coil spring 77 is mounted within the front portion of chamber 15 and has a front end 76 adjacent front end 47 of housing 19 and a rear end 78 which is adjacent the front radial flange of piston 75, and adjacent and forward of seal 79. Front end 76 of spring 77 is in contact with surface 28 of front wall 20 of housing 21, and rear end 78 of spring 77 is in contact with front surface 106 of front radial flange 100. Spring 77 biases piston assembly 7 rearwardly toward the home or resting position of assembly 7 in which rear end or surface 74 of flange 102 of piston 75 contacts a retaining ring which is similar to ring 41 and is disposed in a groove adjacent the rear of housing 21. The retaining ring extends radially inwardly from inner surface 22 of sidewall 18.

Relief valve or unloader valve 9 (FIGS. 5A and 5B) includes an unloader housing 83, a plunger 85, a coil spring 87 and a housing cap 89. Housing 83 and cap 89 together define an interior chamber 91 having a front entrance opening 90 and a rear entrance opening 92. Plunger 85 is longitudinally slidably movable back and forth (forward and rearward) within interior chamber 91. Housing 83 includes a sidewall which includes an annular radial flange which extends radially inwardly adjacent rear entrance opening 92 and serves as a valve seat 82. Plunger 85 has a wider portion 84 which is within chamber 91 and includes a forward facing annular surface 93 within chamber 91. Plunger 85 includes a narrower portion or narrow stem 95 which extends rearwardly from the rear end of wider portion 84. Typically, wider portion 84 and stem 95 are cylindrical such that the outer diameter of stem 95 is smaller than that of wider portion 84. Stem 95 extends rearwardly out of rear entrance opening 92 to a rearward facing rear terminal end or contact surface or end 96 of stem 95 which is external to and rearward of the back of housing 83 and rear entrance opening 92. Spring 87 has a front end 97 which contacts a rearward facing surface of cap 89 at the front of chamber 91 and a rear end 99 which contacts surface 93.

Plunger 85 tapers rearwardly and inwardly along the rear end of wider portion 84 and the front end of stem 95 to define a seating surface 86 which is movable into and out of engagement with seat 82. Valve 9 and plunger 85 have a closed position (FIGS. 1A, 3, 5A) in which seating surface 86 is in contact with seat 82 to form therebetween a seal and an open position (FIG. 4) in which plunger 85 is forward of its closed position and seating surface 86 is out of contact with seat 82. Spring 87 biases plunger 85 rearwardly toward the closed position of valve 9 and plunger 85. In the closed position, the seal between surface 86 and seat 82 prevents the flow of hydraulic fluid out of chamber 13 into chamber 91 and out of chamber 91 via front entrance opening 90 as long as the pressure of the hydraulic fluid within chamber 13 forward of seal 65 and flange 66 does not exceed a threshold pressure value which in the sample embodiment is created by the rearward force applied by spring 87 on plunger 85 at surface 93. If said pressure exceeds the threshold value created by this rearward force, the pressurized hydraulic fluid will apply a forward force on plunger 85 which overcomes the rearward spring force, forcing plunger 85 to move forward to an open position (which may be further rearward than that shown in FIG. 4) so that hydraulic fluid will flow out of chamber 13 via the open valve into chamber 91 and forward out of front entrance opening 90. In this regard, valve 9 serves as a typical relief valve so that the pressure in chamber 13 forward of seal 65 remains substantially constant absent other conditions described further below.

Housing cap 89 can be tightened via its threaded engagement with housing 83 to increase the compression of spring 87, which thus increases the amount of rearward force applied to plunger 85 via spring 87 and increases the hydraulic fluid pressure required to open valve 9. Alternately, housing cap 89 can be loosened via the threaded engagement with housing 83 to decrease the compression of spring 87, which thus decreases the amount of rearward force applied to plunger 85 via spring 87 and decreases the hydraulic fluid pressure required to open valve 9. Thus, cap 89 can be tightened or loosened as desired to set spring 87 at a desired degree of compression and corresponding rearward force on plunger 85 in order to provide a pressure relief setting which establishes the pressure threshold value noted above.

The operation of actuator 1 and relationships of various components during operation will now be described with reference to FIGS. 1A, 3 and 4. The remainder of this paragraph will provide a description with respect to FIG. 1A, which shows actuator 1 in a static, no-load or residual state in which the pressure on hydraulic fluid in chambers 13 and 15 is at atmospheric pressure or a low residual pressure and the brake fluid in actuator 1 is static. Both piston assemblies 5 and 7 are in their respective home or resting positions and valve 9 (for a given pressure relief setting of valve 9) is in its closed position, which is also their respective rearmost positions as limited by contact respectively with the pressure chamber retaining rings and seat 82 (FIG. 5A).

In the sample embodiment, front end 76 and rear end 78 of spring 77 are forward of front end 61 of spring 63 whereby spring 77 may be entirely forward of front end 61 of spring 63. Typically, at least front end 76 and thus at least a portion of spring 77 is forward of front end 61 of spring 63. Springs 63, 77 and 87 in their fully expanded or decompressed states within their respective chambers, which actually means that each of the springs is still compressed somewhat in order to apply sufficient respective forces on piston assemblies 4 and 7 and plunger 85 to force or bias them to their home positions. Rear seal 67 is rearward of openings 24 and 26, and forward seal 65 is rearward of opening 24 and forward of opening 26. Piston assembly 7, spring 77, housing 21 and valve 9 are entirely forward of front end 50 of assembly 5 and thus entirely forward of each component of assembly 5. Front end 50 of assembly 5 and rear end 74 of assembly 7 define therebetween a normal longitudinal distance D1 which is parallel to the axis along which assemblies 5 and 7 travel back and forth within chambers 13 and 15, respectively. Likewise, contact surface 70 of assembly 5 and rear contact end 96 of plunger 85 define therebetween a normal longitudinal distance D1 which is parallel to the axis along which assemblies 5 and 7 travel back and forth within chambers 13 and 15, respectively. Although distance D1 may vary depending on the specific configuration and calibration of actuator 1, distance D1 may be, by way of example, ⅞ inch.

When a forward force is applied on assembly 5 (wherein the force and forward longitudinal direction of the force is represented by Arrow A in FIGS. 1A, 3 and 4), various movement illustrated by FIGS. 1A, 3 and 4 occurs in response, such as the straight or linear movement or stroke of piston assemblies 5 and 7, plunger 85 and springs 63, 77 and 87. This movement may be thought of as occurring in two movement stages, wherein the first movement stage is represented by the change from FIG. 1A to FIG. 3, in which the primary movement is the forward movement of piston assembly 5 and compression of spring 63 (rear end 62 moves forward) from their first or home positions of FIG. 1A to a second or first-stage intermediate activated position of assembly 5 and spring 63 in FIG. 3. The second movement stage is represented by the change from FIG. 3 to FIG. 4, as detailed further below.

Force A may be applied in any manner, which may include, for example, a pushrod which is received in chamber 64 and pushes forward on assembly 5. Such a pushrod or other force applicator may be part of a brake system of a trailer. Force A may be imparted to assembly 5 by forward momentum of a trailer/towed vehicle during deceleration of a towing vehicle and the towed vehicle when hitched to the towing vehicle. Application of force A during the first movement stage causes assembly 5 to move forward whereby force A is translated to rear end 62 of spring 63 to cause compression of spring 63 as rear end 62 moves forward toward front end 61, front end 2, front wall 14 and inner surface 16. The forward movement of assembly 5 applies a low or lower pressure to brake fluid, some of which is forced to flow up out of the front portion of chamber 13 forward of seal 65 into reservoir 11 through opening 24 as shown by Arrow C in FIG. 1A until seal 65 moves forward past opening 24 to cut off this flow. As assembly 5 moves forward, brake fluid also flows (Arrow D in FIG. 1A) at the lower pressure forward out of the front portion of chamber 13 through passage 81 into chamber 15 and out of chamber 15 through port 53 into the trailer brake system 120 including brake line 54 connected to port 53 and to the brakes of the trailer brake system in order to take the hydraulic "slack" out of the trailer brake system and to actuate the brakes via the lower pressure brake fluid applied to the brakes. If the lower pressure exceeds the pressure setting of valve 9, the brake fluid will force plunger 85 forward to open and allow brake fluid to flow (Arrow B) forward through chamber 91 of valve 9, out of chamber 91 into a conduit (also represented by Arrow B) connected to housing 83 at entrance/exit opening 90, and from the conduit into reservoir 11. Valve 9 thus serves as a pressure relief valve to maintain the brake fluid forward of seal 65 during the first stage at a substantially constant pressure, for instance within five, ten or fifteen pounds per square inch (psi) of a preset pressure setting of valve 9. The pressure setting and substantially constant pressure of the brake fluid may be on the order of about 350 psi or within a range of about 200 to 400 psi although this may vary depending on the specific needs of the trailer brake system. Valve 9 thus serves as a relief valve during the first stage to maintain the substantially constant pressure, but will serve differently in the second stage as discussed further below. The first movement stage ends at the position shown in FIG. 3 when contact surface 70 initially contacts rear contact end 96 of plunger 85 of valve 9 and front end/surface 50 of assembly 5 initially contacts rear end/surface 74 of assembly 7. FIG. 3 shows that assembly 5 has moved forward distance D1 from the home position of FIG. 1A such that contact surface 70 and front end 50 have moved distance D1 to bring them into this initial contact with rear end 96 and rear end 74 respectively. This forward movement to reach the intermediate activated position of assembly 5 of FIG. 3 also causes seal 71 to engage back end 74 to close or seal opening 81 along rear entrance opening 108, thus blocking or cutting off subsequent flow of brake fluid forward from the front portion of chamber 13 into/through passage 81, chamber 15 or the trailer brake system. Instead, only brake fluid at a high or higher pressure will subsequently flow from chamber 15 into the trailer brake system, as detailed below. When seal 71 is in contact with or in engagement with rear surface 74, seal 71 is compressed somewhat to form a seal with rear surface 74. Seal 71 thus moves from a decompressed state when out of contact with or disengaged from surface 74 (FIG. 1A) to a compressed state when in contact or in engagement with surface 74. It is noted that an alternate seal analogous to seal 71 may be secured to rear surface 74 instead of front section 73 of assembly 5 whereby the alternate seal would serve the same purpose as seal 71 by forming a seal with section 73 when brought into contact therewith. Any suitable seal may be used which in the position of FIG. 3 will cut off fluid communication between the front of chamber 13 and entrance opening 108 of passage 81 and thus passage 81, chamber 15 and the conduits and brakes of the trailer brake system.

The present paragraph will provide a description with respect to FIG. 3, which shows actuator 1 in a low or lower pressure state in which the pressure on hydraulic fluid in chambers 13 and 15 is the low or lower pressure noted above during the first movement stage, as controlled by the setting of valve 9 in its relief valve capacity. Piston assembly 5 is in the intermediate activated position, piston assembly 7 is in its home or resting position and valve 9 (for a given pressure relief setting of valve 9) is in its closed position. Thus, the positions of the various components of assembly 7 and valve 9 are the same as described above with reference to FIG. 1A, whereby the corresponding description is not repeated. Spring 63 is in a partially decompressed state which is more compressed than in the home position (FIG. 1A) of spring 63 and thus rear end 62 is forward of its home position and closer to front end 61, front end 2, front wall 14 and inner surface 16 than when in the home position of spring 63. Rear seal 67 is rearward of openings 24 and 26, and forward seal 65 is forward of openings 24 and 26. Piston assembly 7, spring 77 and housing 83 of valve 9 are entirely forward of front end 50 of assembly 5 and thus entirely forward of each component of assembly 5. The majority of housing 21 is forward of front end 50 and seal 71. Front end 50 of assembly 5 is in contact with rear end 74 of assembly 7 and contact surface 70 of assembly 5 is in contact with rear contact end 96 of plunger 85. Front end is thus closely adjacent or in contact with rear end 8 of chamber 15. Front end 50 of assembly 5 is forward of rear contact end 96 of plunger 85 and is forward of and adjacent rear end 49 of housing 21. The front end of seal 71 is in contact with rear end 74 of assembly 7 whereby the front end of seal 71 is thus closely adjacent or in contact with rear end 8 of chamber 15.

As noted above, the second movement stage is represented by the change from FIG. 3 to FIG. 4, in which primary movement includes the forward movement of piston assembly 5 and further compression spring 63 (rear end 62 moves further forward toward front end 61, front end 2, front wall 14 and inner surface 16) from their second or first-stage intermediate positions of FIG. 3 to a third, subsequent or second-stage forward activated position of assembly 5 and spring 63 in FIG. 4. The second movement stage also includes forward movement of piston assembly 7 and plunger 85, compression of spring 77 (rear end 78 moves forward) and spring 87 (rear end 99 moves forward toward front end 97 and front end 90 of housing 83) from their first or home positions of FIGS. 1A and 3 to a second, subsequent or forward activated position of assembly 7, plunger 85 and springs 77 and 87 in FIG. 4.

Continued application of force A during the second movement stage (FIG. 3 position to FIG. 4 position) causes assembly 5 to continue to move forward, to push assembly 7 forward via the engagement between front end/surface 50 and rear end/surface 74 and to push plunger 85 forward via the engagement between contact surface 70 and contact end 96. The second movement stage begins when assemblies 5 and 7 begin to move forward from the position shown in FIG. 3. The second stage thus initiates forward movement of assembly 7 and plunger 85, before which assembly 7 and plunger 85 remained in their home positions. The continued or further forward movement of assembly 5 causes further compression of spring 63 so that rear end 62 moves further forward to adjacent the back end of housing 21 and also causes further compression of spring 87 so that rear end 99 moves further forward within chamber 91 toward front end 97 and front end 90 of housing 83. All of springs 63, 77 and 87 are in a state of compression during the second stage which is greater than that during the first stage. The forward movement of plunger 85 moves plunger 85 and valve 9 to an open position (such as shown in FIG. 4) in which seating surface 88 is disengaged or out of contact with seat 82, thereby allowing brake fluid to flow out of the front portion of chamber 13 forward of seal 65 through valve 9, conduit B and into reservoir 11. This allows assembly 5 to continue to move forward with minimal resistance from brake fluid within the front portion of chamber 13 due to resultant minimal pressure on that brake fluid (for example, no more than 5, 10, 15 or 20 psi), as opposed to the resistance to forward movement of assembly 5 that would otherwise exist if valve 9 remained closed (for example, a pressure of 200 to 400 psi). Valve 9 thus serves to unload brake fluid from chamber 13 through chamber 91 during the second stage without the resistance to brake fluid flow that would otherwise occur if spring 87 were allowed to bias or force seating surface 86 against seat 82, as it does during the first stage when valve 9 serves as a relief valve.

Because assembly 5 is thus allowed to move forward during the second stage with only the minimal resistance noted above, assembly 5 can push assembly 7 forward in response to continued application of force A. Assemblies 5 and 7 thus move forward together. The forward movement of assembly 7 causes compression of spring 77 so that rear end 78 moves forward toward front end 76, front end 6, front wall 20 and inner surface 28. When force A is applied by assembly 7 to brake fluid forward of seal 79 while seal 71 continuously blocks communication between chamber 13 and passage 81 and thus prevents flow of brake fluid between chamber 13 and passage 81, the pressure of the brake fluid forward of seal 79 is increased to a high or higher pressure which is substantially higher than that of the low or lower pressure fluid which was discussed above, which occurred during the first stage and which was created by application of force A to the brake fluid only via assembly 5. The high or higher pressure may, for example, be at least 1.5, 2.0, 2.5, 3.0, 3.5 or 4.0 times that of the low or lower pressure. The forward movement of assembly 7 causes or forces brake fluid forward of seal 79 to flow (Arrow E in FIG. 4) at the higher pressure out of chamber 15 through port 53 into the trailer brake conduits/lines to actuate the trailer brakes at a substantially higher pressure. As assemblies 5 and 7 move forward during the second stage over the second additional distance (D3, D4), front end 50 and front portion 80 move into chamber 15 immediately rearward of assembly 7.

FIG. 4 shows that assembly 5 has moved forward a total distance D2 from the home position of FIG. 1A, wherein distance D2 is greater than distance D1, such that contact surface 70 and front end 50 have moved a total distance D2 and respectively pushed plunger 85 and assembly 7 forward distances D4 and D3. Distance D3 represents the distance that assembly 5 and assembly 7 moved forward during the second movement stage. D3 is the same or nearly the same as distance D4. Distance D2 equals distance D1 plus distance D3. As an example, distance D1 may be about ⅞ inch, distance D2 may be about 1¼ inch, and each of distances D3 and D4 may be about ⅜ inch. However, these distances may vary depending on the specific configuration needed.

The present paragraph will provide a description with respect to FIG. 4, which shows actuator 1 in a high or higher pressure state in which the pressure brake fluid in chamber 13 forward of seal 65 is at the minimal pressure discussed above (for example, no more than 5, 10, 15 or 20 psi) and the pressure on brake fluid in chamber 15 forward of seal 79 is the high or higher pressure noted above during the second movement stage. Piston assembly 5 is in the forward activated position and piston assembly 7 and valve 9 are in their respective activated position and open position. Assembly 5 is further forward of its home and intermediate activated positions, assembly 7 is further forward of its home position, and plunger 85 of valve 9 is further forward of its closed position. In particular, plunger 85 is distance D4 forward of its closed position. In the sample embodiment, front end 76 and rear end 78 of spring 77 are forward of front end 61 of spring 63 whereby spring 77 may be entirely forward of front end 61 of spring 63. Typically, at least front end 76 and thus at least a portion of spring 77 is forward of front end 61 of spring 63. Springs 63, 77 and 87 in their fully decompressed or nearly fully decompressed states within their respective chambers, and thus more compressed than the positions of FIGS. 1A and 3. Rear seal 67 is rearward of openings 24 and 26 and forward seal 65 is forward of openings 24 and 26. Piston assembly 7, spring 77 and housing 83 of valve 9 are entirely forward of front end 50 of assembly 5 and thus entirely forward of each component of assembly 5. A portion or majority of housing 21 and a portion or majority of chamber 15 are forward of front end 50 and seal 71. Front end 50 of assembly 5 is in contact with rear end 74 of assembly 7 and contact surface 70 of assembly 5 is in contact with rear contact end 96 of plunger 85. Front end 50 and front portion 80 are within chamber 15 and thus forward of rear end 8 of chamber 15. Front end 50 and rear end 74 are distance D3 forward of rear end 8 and the front surface of the retaining ring which retains assembly 7. All or a portion of seal 79 is within chamber 15. Front end 50 is forward of rear contact end 96 of plunger 85 and is forward of rear end 49 of housing 21. Contact end 96 is forward of its home position of FIGS. 1A and 3, but still rearward of back end/rear entrance opening 92 of housing 83.

When force A is removed, spring 87 forces plunger 85 rearward to the closed position while spring 77 forces piston assembly 7 rearward to its home position. Meanwhile, brake fluid flows rearward through chamber 91 into chamber 13 (while valve 9 is still open) and rearward into chamber 15 from brake line 54. Spring 63 also forces piston assembly 5 rearward to its home position. After assembly 5 moves rearward to the extent that seal 71 separates from rear end 74, brake fluid flows rearward from chamber 15 into chamber 13 via passage 81. Within a relatively short period after force A is removed, assemblies 5 and 7 return to their home positions and valve 9 returns to its closed position.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the sample embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the sample embodiment" does not necessarily refer to the same embodiment, though it may.

The invention claimed is:

1. An actuator comprising:
   a housing defining a low pressure chamber and a high pressure chamber;
   a low pressure piston assembly which is in the low pressure chamber and has a contact surface;
   a high pressure piston assembly which is in the high pressure chamber and which moves jointly with the low pressure piston assembly and forward along a longitudinal axis in response to forward movement of the low pressure piston assembly; and
   an unloader valve in fluid communication with the low pressure chamber and having an elongated stem offset and parallel to the longitudinal axis that moves between a closed position and an open position which allows hydraulic braking liquid to flow out of the low pressure chamber through the unloader valve;
   wherein the contact surface engages and pushes the elongated stem of the unloader valve longitudinally from the closed position to the open position during forward movement of the low pressure piston assembly along the longitudinal axis so that hydraulic braking liquid flows longitudinally out of the low pressure chamber through the unloader valve.

2. The actuator of claim 1 wherein the unloader valve serves as a pressure relief valve which opens in response to hydraulic braking liquid in the low pressure chamber exceeding a threshold pressure value, and further comprising:
   a rear terminal end on the elongated stem of the unloader valve positioned rearward from a rear end of the high pressure piston assembly.

3. The actuator of claim 1 wherein the the elongated stem forms a portion of a plunger and the unloader valve further includes a housing defining an interior chamber in which the plunger is received; wherein the contact surface engages and pushes a rear terminal end of the stem to move the plunger longitudinally forward from the closed position to the open position during forward movement of the low pressure piston assembly along the longitudinal axis.

4. The actuator of claim 1 wherein the housing comprises a sidewall and a front wall extending radially inwardly from the sidewall; the sidewall and front wall at least partially define the low pressure chamber; and the front wall defines a longitudinally aligned through hole in which the unloader valve is mounted.

5. The actuator of claim 1 wherein the low pressure piston assembly includes a seal connected to a forward end of a low pressure piston, wherein the seal is movable inside the high pressure chamber.

6. The actuator of claim 5 wherein the seal is inside the high pressure chamber when the contact surface engages a rear terminal end of the stem of the unloader valve and the seal is outside the high pressure chamber when the contact surface is disengaged from the rear terminal end of the stem of the unloader valve.

7. The actuator of claim 5 wherein the low pressure piston assembly has an activated position in which the portion is inside the high pressure chamber and a home position in which the portion is outside the high pressure chamber.

8. The actuator of claim 5 wherein the low pressure piston assembly has a front section which includes the portion, a flange which extends radially outwardly from the front section and a seal which is forward of and adjacent the flange; and the flange and seal are rearward of the portion.

9. The actuator of claim 1 wherein the low pressure piston assembly has a forward facing surface; the high pressure piston assembly has a rearward facing surface; and the low pressure piston assembly has an activated position in which the forward facing surface contacts the rearward facing surface; and wherein the rearward facing surface of the high pressure piston assembly is positioned forwardly from a rear terminal end on the elongated stem.

10. The actuator of claim 1 wherein the low pressure piston assembly has a front end; and the high pressure piston assembly has a rear end; and further comprising a seal extending between the front end and the rear end, wherein the seal moves within the high pressure chamber forwardly along the longitudinal axis when a low pressure piston and a high pressure piston join together and move forward along the longitudinal axis.

11. The actuator of claim 1 wherein the high pressure piston assembly defines a through hole having front and rear entrance openings; and the front entrance opening is within the high pressure chamber, and the high pressure piston assembly further comprising a seal extending around a high pressure piston, the seal having a radially inward first segment and a radially outward second segment which is secured to an outer radial end of the first segment configured to flare radially outward if the hydraulic braking liquid pressure forward of the seal is higher than the hydraulic braking liquid pressure behind the seal.

12. The actuator of claim 11 wherein the seal is adjacent the rear entrance opening.

13. The actuator of claim 1 wherein the low pressure chamber has a front end; and the high pressure chamber extends forward beyond the front end of the low pressure chamber.

14. The actuator of claim 1 wherein the low pressure piston assembly has a low pressure piston home position in which the low pressure piston assembly is not in contact with the high pressure piston assembly.

15. The actuator of claim 14 wherein the low pressure piston assembly has a low pressure piston activated position which is forward of the home position and in which the low pressure piston assembly is in contact with the high pressure piston assembly.

16. The actuator of claim 15 wherein the high pressure piston assembly defines a longitudinally aligned through hole; wherein the longitudinally aligned through hole is in fluid communication with the low pressure chamber when the low pressure piston assembly is in the home position; and the low pressure piston assembly closes the through hole in the activated position so that the longitudinally aligned through hole is not in fluid communication with the low pressure chamber.

17. The actuator of claim 1 wherein the high pressure piston assembly has a high pressure piston home position and a high pressure piston activated position which is forward of the high pressure piston home position; and the low and high pressure piston assemblies are movable forward together so that the low pressure piston assembly is in contact with the high pressure piston assembly in the high pressure piston home position and in the high pressure piston activated position.

18. The actuator of claim 1 further comprising a first spring which biases the high pressure piston assembly rearwardly; and a second spring which biases the low pressure piston assembly rearwardly.

19. The actuator of claim 1 further comprising a first spring which biases the high pressure piston assembly rearwardly; wherein the first spring is in the high pressure chamber and has a rear end which engages the high pressure piston assembly.

20. The actuator of claim 19 further comprising a second spring which biases the low pressure piston assembly rearwardly; wherein the second spring is in the low pressure chamber and has a rear end which engages the low pressure piston assembly and a front end; and the first spring has a front end which is forward of the front end of the second spring.

21. A method of operating a surge brake actuator comprising the steps of:
providing a low pressure piston assembly in a low pressure piston chamber and a high pressure piston assembly in a high pressure piston chamber in fluid communication with the low pressure piston chamber; and
moving the low pressure piston assembly forward along a longitudinal axis within the low pressure chamber a first distance toward the high pressure piston assembly so that the low pressure piston assembly forces hydraulic braking liquid at a first pressure from the low pressure chamber through a passage in the high pressure piston assembly until the low pressure piston assembly sealingly contacts the high pressure piston assembly to stop additional flow of hydraulic braking liquid through the passage;
pushing an unloader valve parallel to the longitudinal axis to open via contact of the low pressure piston assembly with the unloader valve during forward movement of the low pressure piston assembly to allow hydraulic braking liquid to flow out of the low pressure chamber through the unloader valve; and
while the unloader valve remains open, moving the low pressure piston assembly forward within the lower pressure chamber a second additional distance so that the low pressure piston assembly pushes the high pressure piston assembly forward whereby the high pressure piston assembly forces hydraulic braking liquid forward of the high pressure piston assembly at a second higher pressure out of the high pressure chamber via a high pressure chamber exit port.

22. The actuator of claim 1 wherein during forward movement of the low pressure piston assembly, the contact surface of the low pressure piston assembly initially contacts the unloader valve when the low pressure piston assembly initially contacts the high pressure piston assembly so that forward movement of the unloader valve and forward movement of the high pressure valve assembly are initiated together.

23. The method of claim 21 wherein during forward movement of the low pressure piston, the low pressure piston assembly initially contacts the unloader valve when the low pressure piston assembly initially contacts the high pressure piston assembly so that forward movement of the unloader valve and forward movement of the high pressure valve assembly are initiated together.

24. An actuator comprising:
a housing defining a low pressure chamber and a high pressure chamber;
a low pressure piston assembly which is in the low pressure chamber and has a contact surface;
a high pressure piston assembly which is in the high pressure chamber and which moves forward along a longitudinal axis in response to forward movement of the low pressure piston assembly; and
an unloader valve in fluid communication with the low pressure chamber and having a closed position and an open position which allows hydraulic braking liquid to flow out of the low pressure chamber through the unloader valve, wherein the unloader valve comprises a plunger terminating in a free end positioned rearwardly from the high pressure piston assembly such that the contact surface directly contacts the free end and pushes the plunger forward prior to the low pressure piston assembly, wherein the plunger is offset and aligned parallel to the longitudinal axis;

wherein the contact surface pushes the unloader valve from the closed position to the open position during forward movement of the low pressure piston assembly so that hydraulic braking liquid flows out of the low pressure chamber through the unloader valve.

25. The actuator of claim 24, further comprising:
a first axis along which the high pressure and low pressure piston assemblies linearly travel; and
a second axis associated with the plunger on the unloader valve along which the unloader valve moves from the closed position to the open position, wherein the second axis is offset and parallel to the first axis.

26. The actuator of claim 24, in combination with a trailer having hydraulically actuated brakes towed by a towing vehicle and the actuator is mounted on the trailer rearwardly from the towing vehicle, wherein the combination comprises:
a receiving chamber defined by the low pressure piston assembly receiving a pushrod operatively connected to the trailer;
wherein the pushrod on the trailer is moved forwardly relative to deceleration of the towing vehicle when the trailer is hitched thereto, and the forward movement of the pushrod moves the low pressure piston assembly forward to impart a braking force to the trailer brakes.

27. The actuator of claim 24 wherein the housing comprises a sidewall and a front wall extending radially inwardly from the sidewall; the sidewall and front wall at least partially define the low pressure chamber; and the front wall defines a through hole in which the unloader valve is mounted offset parallel to the high pressure chamber.

28. The actuator of claim 24, wherein the high pressure chamber is isolated and independent such that no braking liquid flows through the unloader valve from the high pressure chamber when a forward end of the low pressure piston assembly sealingly engages the high pressure piston assembly.

29. The actuator of claim 24, further comprising:
a braking application force applied to the low pressure piston assembly wherein the actuator maintains a substantially constant pressure inside an unloader valve chamber when the unloader valve is moved from the closed position to the open position.

* * * * *